Sept. 11, 1956 C. S. WILCOX 2,762,464
TRAIN SPEED CONTROL SYSTEM
Filed Jan. 26, 1954
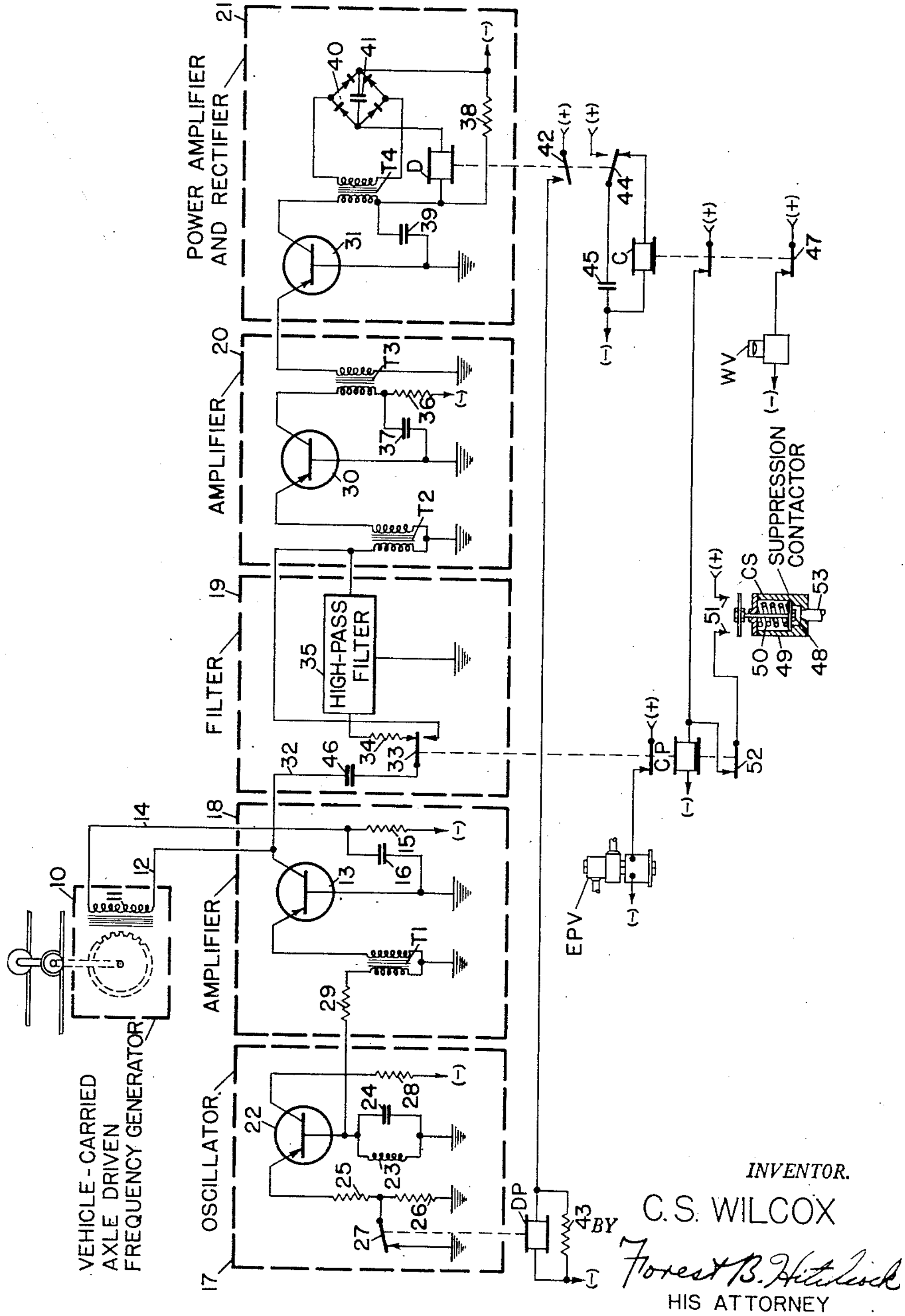
*INVENTOR.*
C. S. WILCOX
BY Forest B. Hitchcock
HIS ATTORNEY United States Patent Office 2,762,464

Patented Sept. 11, 1956

2,762,464

TRAIN SPEED CONTROL SYSTEM

Clinton S. Wilcox, Brighton, N. Y., assignor to General Railway Signal Company, Rochester, N. Y.

Application January 26, 1954, Serial No. 406,194

8 Claims. (Cl. 188—181)

This invention relates to speed control systems for vehicles, and more particularly pertains to frequency responsive electronic apparatus using transistors in a control system for regulating the speeds of trains.

Railroad locomotives are frequently equipped with a mechanical, axle-driven, centrifugally operated speed contactor. This contactor has one or more contacts which close at respective predetermined speeds and may be used with associated apparatus to limit the speed of the train. However, since the speed contactor is mounted on the journal box of the locomotive or tender, it is subject to severe vibrations which tend to affect its reliability.

To overcome this inherent difficulty with respect to the mechanical type of contactor, there has been developed a speed responsive circuit controller which comprises an axle-driven frequency generator whose output frequency is proportional to train speed. The output of this frequency generator is fed over a cable to electronic apparatus at a remote location on the locomotive. This variable frequnecy signal is applied to an electron tube amplifier and associated filtering means, and the resulting output is used to control a brake controlling electro-pneumatic valve. When the train speed exceeds a predetermined maximum desired value, the output frequency of the frequency generator is sufficiently high to be passed by the filtering means and cause actuation of the valve if the brakes are not promptly applied by the trainman. If actuation of this valve occurs, however, an automatic brake application will occur.

In the speed control system of this invention, the variable frequency signal obtained from the frequency generator is applied to an improved amplifier organization comprising a plurality of transistor amplifier stages and to a high-pass filter. An electronic oscillator also comprising a transistor is associated with the amplifier organization to provide a continuous check on the integrity of both the amplifying means and the variable frequency generator. The keyed output of the oscillator, whose output frequency is sufficiently high so that it can readily pass through the filter, is amplified by the transistor amplifier and used to intermittently actuate a detector relay. This intermittent actuation of the detector relay is required to maintain the electro-pneumatic valve energized so that the train brakes will not automatically be applied. Since the amplifying means comprises, as one component thereof, the winding and connections of the variable frequency generator, any failure in either the frequency generator and its connections, the oscillator, or its amplifying and filtering means prevents this intermittent operation of the detector relay so that the valve becomes deenergized.

When the train is operating below its preselected maximum speed, the output frequency of the frequency generator is blocked by a high-pass filter. When the preselected maximum speed of the locomotive is reached, the output frequency of the frequency generator becomes sufficiently high to pass through the high-pass filter. This causes the detector relay to be continually rather than intermittently actuated and also results in the deenergization of the electro-pneumatic valve. A service brake application must, therefore, be promptly made to avoid an automatic application of the brakes.

An object of this invention is to provide a speed control system for trains wherein a variable frequency, proportional to the speed of the train, is amplified by a transistor amplifier having its integrity constantly checked by requiring it to continually pass the intermittent, keyed output frequency of a transistor oscillator.

Another object of this invention is to provide a train speed control system wherein the winding and connections to a variable frequency generator are constantly checked by reason of their forming an integral part of a transistor amplifier stage.

An additional object of this invention is to provide a train speed control system having a transistor oscillator stage for checking the integrity of the circuits of said system wherein said oscillator is intermittently keyed by alternately short-circuiting a resistor included in the circuit of said oscillator.

Still another object is to provide a train speed control system having a relay-controlling transistor amplifier incorporating a high degree of sensitivity.

Other objects, purposes, and characteristic features of this invention will in part be obvious from the accompanying drawings and part pointed out as the description of the invention progresses.

In discussing this invention in detail, reference will be made to the accompanying drawing which illustrates in detail one embodiment of this invention.

To simplify the illustration and facilitate the explanation of this invention, the various parts and circuits have been shown diagrammatically. Certain conventional illustrations have been employed, and the drawings have been made to make it more easy to understand the principles and manner of operation rather than to illustrate the specific construction and arrangement of parts that might be used in practice. The various relays and their contacts are illustrated in a conventional manner, and symbols are used to indicate connections to the terminals of batteries or other sources of electric current instead of showing all of the wiring connections to these terminals. Thus, the symbols (+) and (−) indicate the opposite terminals of a suitable source of direct current power used for operation of both the relays and the transistors.

The vehicle-carried, axle-driven, frequency generator which provides an output frequency proportional to the train speed is shown diagrammatically in the drawing. Described briefly, this frequency generator comprises a toothed tone wheel operating in a magnetic circuit and causing a voltage to appear by induction in the winding 11. This frequency generator may assume any of various forms and may be of the kind shown in the patent to O. S. Field, No. 2,651,734, dated September 8, 1953. One output wire 12 connected to the lower terminal of winding 11 is connected to the collector of the transistor 13, and the upper terminal of this winding 11 is connected over wire 14 to one terminal of a resistor 15 which has its other terminal connected to (−). The resistor 15 is shunted by the capacitor 16 connected from the upper terminal of resistor 15 to ground.

The electronic apparatus associated with the winding 11 of the frequency generator 10 comprises an oscillator 17 which supplies its output to the amplifier 18. The output of the oscillator 17 being thus amplified by the amplifier 18 is applied to a filter 19. The output of the filter 19 is then applied to another transistor amplifier 20 whose output is then applied to a power amplifier and rectifier 21 which then controls a detector relay D.

The oscillator 17 includes a transistor 22 which is preferably of the point contact type The inclusion of an impedance in the base circuit of a transistor of this type causes it to oscillate. The impedance connected in the base circuit of the transistor 22 comprises a parallel tuned circuit consisting of the inductor 23 and capacitor 24. The resonant frequency of this parallel tuned circuit determines the output frequency of the oscillator. The emitter of the oscillator is connected through resistors 25 and 26 in series to ground. Resistor 26 is selectively short-circuited through back contact 27 of relay DP. The collector of this transistor 22 is connected through resistor 28 to the terminal (—).

The output frequency of the oscillator 17 is obtained from the base of transistor 22 and applied through a resistor 29 to the primary winding of a transformer T1. The lower terminals of both windings of this transformer T1 are connected to ground, and the upper terminal of the secondary winding is connected directly to the emitter of a transistor 13. This transistor 13 as well as the remaining transistors 30 and 31 may be either of the point contact or junction type.

The base of transistor 13 is grounded. The collector circuit of this transistor 13 includes the winding 11 of the frequency generator 10 as already described. The collector is also connected over wire 32, through capacitor 46, front contact 33 of relay CP, and through resistor 34 to the input of a high-pass filter 35. The output of the high-pass filter 35 is connected to one terminal of the primary winding of a transformer T2 whose other terminal is grounded. The lower terminal of the secondary winding of this transformer T2 is connected to ground and its upper winding is connected directly to the emitter of transistor 30.

The base of this transistor 30 is grounded, and its collector is connected through the primary winding of transformer T3 and through resistor 36 to (—). Resistor 36 is bypassed by capacitor 37 which is connected from the upper terminal of resistor 36 to ground.

The voltage appearing across the secondary winding of transformer T3 is applied between ground and the emitter of the power amplifier transistor 31. The base of this transistor is also grounded, and its collector is connected through a primary winding of transformer T4 and resistor 38 to the termnial (—). This resistor 38 is also bypassed by the capacitor 39 which connects from the lower terminal of the primary winding of transformer T4 to ground.

The voltage appearing across the secondary winding of transformer T4 is applied to the terminals of a full-wave rectifier 40. The direct-current output of this rectifier is filtered by the capacitor 41, and then filtered output is then applied to the winding of the detector relay D.

It will first be assumed that the train is operated at a sufficiently low speed to ensure that the output frequency of the frequency generator 10 is not high enough to pass through the high-pass filter 35. Under these circumstances, if the relay DP is in its dropped-away condition so that its back contact 27 is closed, resistor 26 included in the emitter circuit of the transistor 22 will be short-circuited. This resistor 26 is of a relatively large value of resistance so that its inclusion in the emitter circuit of transistor 22 when back contact 27 is open prevents the oscillator from oscillating. Under the present conditions, however, with this resistor 26 short-circuited, the oscillator 17 is conditioned to be operative.

The output frequency of the oscillator is then amplified by the amplifier 18 and since relay CP is normally picked up as will be explained, the output of amplifier 18 is applied through front contact 33 of repeater relay CP and through resistor 34 to the input of the high-pass filter 35. The output frequency of the oscillator 17 is selected by proper selection of the resonant frequency of the tuned circuit included in its base so as to pass readily through the high-pass filter 35. It thus appears across the primary winding of transformer T2, and the induced secondary voltage of this transformer then is applied between base and emitter of transistor 30. The amplified output at the collector of this transistor 30 is then transformer-coupled to the emitter of transistor 31. The power amplifier and rectifier 21 comprising transistor 31 amplify this input voltage and cause an input to be applied to the rectifier 40 with the result that direct current will pass through the winding of the detector relay D.

The winding of relay D and series-connected rectifier 40 are connected in parallel with resistor 38 in the collector circuit of transistor 31 so that a portion of the collector current passes through the winding of relay D. When no alternating input voltage is applied to the emitter of transistor 31, the collector current is at a low value so that the current passing through the winding of relay D is substantially below that required for this relay to be actuated.

When the emitter of this output transistor has an alternating voltage applied to it, the energization of relay D increase because of the rectified output received through the windings of transformer T4 as already described. In addition, the average value of collector current is increased so that a greater value of current passes from the collector, through relay D, and rectifier 40, to (—), thereby further increasing the energization of relay D. These two separate currents add to produce a sufficient energization of relay D to pick this relay up. Thus, an increased sensitivity of the apparatus results from the inclusion of the winding of relay D in the collector circuit of transistor 31.

When relay D picks up, its front contact 42 closes and causes the relay DP to be energized. Because of the resistor 43 shunting the winding of relay DP, this relay is relatively slow to operate so that it does not pick up until a short time has elapsed following its energization. When this relay DP does pick up, however, it opens its back contact 27 so that the high resistance of resistor 26 is now included in the emitter circuit of the transistor 22. This causes the oscillator 17 to immediately stop oscillating wtih the result that an input is no longer received by the rectifier 40 which controls the operation of detector relay D. Relay D then drops away and opens its front contact 42. After a brief interval caused by the slow action of relay DP, this relay DP drops away and closes its back contact 27 so as to shunt the resistor 26. The oscillator 17 then again becomes operative so that relay D is once more picked up. In this manner, a self-coding operation takes place with the oscillator 17 becoming alternately operative and then inoperative as relay DP picks up and drops away respectively.

The intermittent operation of relay D that results is effective to maintain the relay C energized. Thus, each time that relay D picks up, a circuit is completed through front contact 44 of relay D to charge the capacitor 45. Each time relay D drops away to close its back contact 44, this charged capacitor is connected across the winding of relay C. Since relay C is provided with slow releasing characteristics as indicated by the heavy base line for the symbol representing this relay, the intermittent energization of this relay from the capacitor 45 causes this relay to remain picked up. Obviously, if relay D should fail to operate between its picked-up and dropped-away conditions and remain in one condition or the other as a result of some circuit fault, relay C would drop away. Because of the circuit organization used in the train speed control system of this invention, the requirement of intermittent operation of relay D provides a comprehensive check over the entire circuit organization. Thus, any failure of the oscillator or amplifying and filtering means which would prevent receiving an output from the frequency generator will likewise prevent receiving an output from the oscillator. Also, since an integral part of amplifier 18 constitutes the coil 11 of the frequency generator 10 and the connections to such coil, a short circuit or open circuit in this coil or its connections will prevent relay D from responding to the oscillator frequency.

If the train is operating below its preselected maximum speed so that the output frequency of the frequency generator cannot be passed by the high-pass filter 35, this dropping away of relay C indicates a failure of the apparatus. As will presently be described, the dropping away of relay C requires that the brakes be applied, either voluntarily or by automatic means.

Under normal circumstances, with relays C and CP both in their picked-up conditions, the variable frequency output voltage induced in winding 11 of the frequency generator 10 is applied through capacitor 46, front contact 33 of repeater relay CP, and resistor 34 to the high-pass filter 35. As long as the train speed is below its preselected maximum, substantially no output voltage from the high-pass filter 35 and generated by the frequency generator 10 is applied to the emitter circuit of transistor 30. The only signal that can pass through the high-pass filter under these circumstances is the intermittent output signal of the oscillator 17.

When the train speed exceeds the preselected maximum, however, the output frequency of the frequency generator 10 readily passes through the high-pass filter 35 and results in a steady actuation of the relay D so that this relay remains steadily picked up rather than being alternately picked up and dropped away. As a result, relay C drops away after a brief interval.

The dropping away of relay C, whether caused by a circuit fault as described or the train's exceeding the speed limit, requires that the train brakes be applied. Thus, when relay C drops away, it opens the energizing circuit for relay CP so that this relay will also drop away after an interval. At the same time, the opening of front contact 47 of relay C causes the whistle valve WV to be deenergized so that a warning whistle will sound. This is an indication that the train speed is above its preselected limit. If the brakes are not immediately applied, the relay CP will drop away after a short interval and cause the valve EPV to be deenergized so that the brakes will be automatically applied. However, if the brakes are promptly applied by the trainman, an increase of pressure will occur at the inlet pipe 53 to the suppression contactor CS. The piston 48 will then move in the cylinder 49 against the compression of the spring 50 so as to close the contacts 51. When this occurs, a stick circuit will be completed through the front contact 52 of relay CP to hold this relay energized. In this way, prompt application of the brakes before relay CP has had time to drop away will prevent this relay from dropping away and thereby maintain the valve EPV constantly energized. Various kinds of suppression contactors may be used for this purpose. One such contactor is disclosed in the patent to C. S. Bushnell, No. 1,757,410, dated May 6, 1930.

If the relay CP is allowed to drop away so that an automatic service brake application occurs, the apparatus is prevented from resetting to its normal operating condition until the train speed has been reduced to a low value. Thus, if the output of the frequency generator 10 were always applied directly to the high-pass filter 35, a mere reduction in train speed as a result of an automatic brake application would cause the apparatus to be properly reset since it would only be required that the output frequency of the frequency generator be sufficiently reduced so that it could not pass through the high-pass filter 35. The coding action of the oscillator 17 would then again cause relay D to intermittently pick up and drop away so that relays C and relay CP would then again be restored to their normal picked-up conditions.

However, the dropping away of relay CP which causes the automatic brake application to take place by deenergizing valve EPV also causes the output of the frequency generator 10 to pass through back contact 33 of relay CP directly to the primary winding of transformer T2 rather than requiring this signal to be applied first to the high-pass filter 35. A signal is thus continually applied to the emitter circuit of the transistor 30 so that continuous energization is effective on the winding of relay D even when the train speed is considerably reduced to a point where the output frequency of the frequency generator 10 can no longer pass through the high-pass filter 35. The relay D thus remains continuously energized until the train speed is reduced to such a low level that the amplitude of voltage obtained from the frequency generator 10 is no longer sufficient to provide an output of the power amplifier and rectifier 21 large enough to maintain relay D continually energized. As a result, the relay D can then again drop away and pick up intermittently causing the oscillator 17 to also operate in this intermitten fashion so that relays C and CP again pick up. In one specific embodiment of this invention, the output of the frequency generator was also regulated and the sensitivity of the amplifier stages so adjusted that the relay D would remain continually energized while relay CP was dropped away until the train speed was reduced to approximately six miles per hour.

Having described an improved train speed control system employing transistor circuits as one specific embodiment of this invention, I desire it to be understood that various modifications, adaptations and alterations may be made to the specific form shown to meet the requirements of practice, without in any manner departing from the spirit or scope of this invention.

What I claim is:

1. Train-carried apparatus for a speed control system comprising, an axle-driven frequency generator having a coil with a voltage induced therein proportional in frequency to the speed of said train, amplifying and high-pass filtering circuit means responsive to the voltage induced in said coil and effective to provide a steady output when the speed of said train exceeds a preselected maximum value, a keyed oscillator having its intermittently occurring output frequency also applied to said amplifying and filtering circuit means, said oscillator comprising a transistor having a frequency determining resonant circuit in its base circuit, said oscillator transistor having a resistance connected in its emitter circuit effective to render said oscillator inoperative, relay circuit means for normally shunting said resistor to permit operation of said oscillator and being responsive to the output of said amplifying and filtering circuit means to unshunt said resistance to thereby cause said oscillator to become inoperative, an electro-pneumatic valve being effective when deenergized to slow the speed of said train, said valve being held energized only when said relay circuit means is operated intermittently but becoming deenergized when said relay is maintained steadily in its one condition or the other.

2. Train-carried apparatus for a speed control system comprising, an axle-driven frequency generator having a coil with a voltage induced therein proportional in frequency to the speed of said train, amplifying and filtering means responsive to said induced variable frequency voltage, relay circuit means responsive to the output of said amplifying and filtering means, train speed controlling means governed by said relay circuit means and being effective to impose a speed restriction when the speed of said train reaches a predetermined maximum value causing the output frequency of said frequency generator to be passed by said filtering means and appear in the output of said amplifier means, an oscillator being intermittently keyed to cause its output to be periodically applied to said amplifier and filtering means to thereby check the integrity of said amplifying and filtering means, said oscillator comprising a transistor of the point contact type having in its base circuit a resonant circuit tuned to a frequency related to he desired output frequency of said oscillator, said oscillator frequency being selected to pass through said filtering means, an emitter circuit for said transistor connecting said emitter through a disabling resistance of high value to ground, and keying means for said oscillator governed by said relay circuit means and being effective to intermittently shunt said disabling resistor and thereby render said oscillator operative.

3. Train-carried apparatus for a speed control system comprising, an axle-driven frequency generator having a coil with a voltage induced therein proportional in frequency to the speed of said train, an oscillator comprising a transistor, an amplifier comprising a second transistor having its base grounded, transformer coupling means for applying the output of said oscillator to the emitter of said second transistor, a negative source of biasing potential, a collector circuit for said amplifier transistor connecting said collector through said coil of said frequency generator and a resistor to said negative source of biasing potential, a capacitor by-passing said resistor, filtering and amplifying circuit means responsive to the voltage appearing at said collector of said second transistor, said filtering means being effective to pass the output frequency of said oscillator but being effective to pass the output frequency of said frequency generator only when the speed of said train exceeds a predetermined limit, and relay circuit means responsive to the reception of an output from said filtering and amplifying circuit means for rendering said oscillator inoperative to thereby cause said oscillator to be intermittently keyed, and train speed controlling apparatus being rendered ineffective to regulate the speed of said train only when an output is intermittently received from said filtering and amplifying circuit means.

4. In a speed control system for trains, train-carried apparatus comprising, an axle-driven frequency generator having a coil with a voltage induced therein proportional in frequency to the speed of said train, an oscillator including a transistor of the point contact type, a frequency determining resonant circuit in the base circuit of said transistor, an emitter circuit for said transistor including a normally shunted resistor having a large value of resistance capable of causing said oscillator be be inoperative, a transistor amplifier having its emitter input voltage transformer-coupled from said base of said transistor included in said oscillator, said coil of said frequency generator being included in the output collector circuit of said transistor included in said amplifier, high-pass filtering means responsive to the voltage appearing across said coil and being adapted to pass the relatively high input frequency of said oscillator but to pass the variable frequency of said frequency generator only when the speed of said train reaches a predetermined maximum value, additional amplifier circuit means being responsive to the output of said filter circuit means, rectifier means controlled by said amplifier means for providing a direct-current output for controlling an electromagnetic relay, means governed by said relay when actuated for unshunting said resistor included in the base circuit of said oscillator transistor to thereby make said oscillator inoperative, said relay being thereby operated intermittently when said train speed is below said maximum value to thereby check the integrity of said frequency generator and said amplifying and filtering circuit means, a repeater relay being actuated only in response to the intermittent actuation of said output relay, brake controlling apparatus for said train being maintained ineffective when said repeater relay is actuated, whereby the failure of said repeater relay to be actuated resulting from a circuit fault in said train-carried apparatus and alternatively as said output frequency of said frequency generator rises to a value causing it to be passed by said filter circuit means is effective to initiate a brake application on said train.

5. In a speed control system for trains, train-carried apparatus comprising, an axle-driven frequency generator having a coil with a voltage induced therein proportional in frequency to the speed of said train, an oscillator comprising a point contact type transistor and having a frequency determining tuned circuit in its base circuit, a transistor amplifier having transformer-coupled to its emitter circuit the output obtained from the base of said transistor included in said oscillator, said transistor amplifier having an output collector circuit including said coil of said frequency generator, high-pass filter circuit means and additional amplifier circuit means for amplifying both the fixed oscillator output frequency and the variable frequency voltage of said frequency generator appearing in said output collector circuit, said high-pass filter circuit means being adapted to pass the relatively high output frequency of said oscillator but to pass the variable output frequency of said frequency generator only when the speed of said train reaches a predetermined maximum value, relay circuit means being actuated by the output of said additional amplifier circuit means, keying means governed by the actuation of said relay circuit means for rendering said oscillator inoperative to thereby cause said oscillatory circuit means and said relay circuit means to operate intermittently when the speed of said train is below said maximum value, and speed controlling means for said train being held ineffective while said relay circuit means is intermittently operated, said speed controlling means becoming effective when the output frequency of said generator is passed by said high pass filter causing said relay circuit means to be continually actuated and alternatively becoming effective when a fault occurs in said train-carried apparatus preventing the output of said oscillator from actuating said relay circuit means.

6. In a speed control system for trains, train-carried apparatus comprising, an axle-driven frequency generator having a coil with a voltage induced therein proportional in frequency to the speed of said train, oscillatory circuit means, a transistor amplifier having said coil of said frequency generator as the output load impedance thereof for amplifying the output of said oscillatory circuit means, high-pass filter circuit means responsive to the voltage appearing across said coil and being adapted to pass the relatively high output frequency of said oscillator but to pass the variable output frequency of said frequency generator only when the speed of said train reaches a predetermined maximum value, additional transistor amplifier circuit means for amplifying the output of said high-pass filter circuit means, relay circuit means governed by the output of said additional amplifier circuit means for rendering said oscillatory circuit means inactive to thereby cause said oscillatory circuit means and said relay circuit means to operate intermittently when the speed of said train is below said maximum value, and speed controlling means for said train being held ineffective while said relay circuit means is intermittently operated but becoming effective when the output frequency of said generator is passed by said high-pass filter causing said relay circuit means to be continuously actuated.

7. In a speed control system for trains, a detector relay having a controlling winding, a transistor amplifier stage for controlling said relay, circuit means for applying an alternating-current input signal to the input circuit of said transistor amplifier, a source of biasing potential, an output circuit for said transistor comprising a connection from the output electrode of said transistor through said winding of said detector relay to said source of biasing potential, rectifying circuit means responsive to the alternating-current output of said transistor amplifier when said signal is applied to said input circuit for providing a direct-current energization of said winding aiding the energization provided by the average value of output current of said transistor, whereby the application of said signal to said input circuit of said transistor increases said average value of current to said winding and also increases the direct current supplied to said winding by said rectifying circuit means to thereby increase the sensitivity of said amplifier stage.

8. In a speed control system for trains, a transistor amplifier stage for amplifying an alternating-current input signal selectively applied thereto to thereby control a detector relay, said amplifier stage comprising a transistor, circuit means for applying said signal to the emitter-base circuit of said transistor, a transformer, a resistor, a negative source of voltage, said transistor having its collector connected through the primary winding of said transformer and said resistor to said negative source of voltage, a full-wave rectifier having its input terminals connected to the secondary of said transformer, a series combination comprising the output terminals of said rectifier and the winding of said detector relay being connected in parallel with said resistor, whereby the application of said input signal to said emitter causes a rectified alternating-current output of said collector for energizing said winding with direct current and also the increase of average current of said collector resulting from said input signal provides increased current through said winding for actuating said relay.

References Cited in the file of this patent

UNITED STATES PATENTS

| | | |
|---|---|---|
| 2,719,911 | Maenpaa | Oct. 4, 1955 |
| 2,719,912 | Maenpaa et al. | Oct. 4, 1955 |